(12) United States Patent
Kwatra et al.

(10) Patent No.: US 11,783,807 B2
(45) Date of Patent: Oct. 10, 2023

(54) VOICE RESPONSE SYSTEMS BASED ON PERSONALIZED VOCABULARY AND USER PROFILING—PERSONALIZED LINGUISTICS AI ENGINES

(71) Applicant: INTERNATIONAL BUSINESS MACHINES CORPORATION, Armonk, NY (US)

(72) Inventors: Shikhar Kwatra, Raleigh, NC (US); Adam Lee Griffin, Dubuque, IA (US); Sarbajit K. Rakshit, Kolkata (IN); Laura Grace Ellis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 16/947,235

(22) Filed: Jul. 24, 2020

(65) Prior Publication Data
US 2022/0028374 A1      Jan. 27, 2022

(51) Int. Cl.
*G10L 15/07* (2013.01)
*G10L 15/22* (2006.01)
(Continued)

(52) U.S. Cl.
CPC ............... *G10L 15/07* (2013.01); *G06N 3/02* (2013.01); *G10L 15/063* (2013.01); *G10L 15/16* (2013.01); *G10L 15/19* (2013.01); *G10L 15/22* (2013.01); *G10L 2015/223* (2013.01); *G10L 2015/227* (2013.01)

(58) Field of Classification Search
CPC .................................. G06N 3/02; G06F 40/35
See application file for complete search history.

(56) References Cited

U.S. PATENT DOCUMENTS

| 7,330,890 B1 | 2/2008 | Partovi |
| 9,858,925 B2 | 1/2018 | Gruber |
(Continued)

FOREIGN PATENT DOCUMENTS

| CN | 110189754 A | 8/2019 |
| CN | 110209897 A | 9/2019 |
(Continued)

OTHER PUBLICATIONS

Zeyer et al. "A Comprehensive Study of Deep Bidirectional LSTM RNNs for Acoustic Modeling in Speech Recognition". ICASSP 2017, pp. 2462-2466 (Year: 2017).*

(Continued)

*Primary Examiner* — Jesse S Pullias
(74) *Attorney, Agent, or Firm* — Anthony Curro

(57) ABSTRACT

A method, computer system, and a computer program product for personalized voice responses is provided. The present invention may include gathering a plurality of user data from an Internet of Things (IoT) connected sensor. The present invention may include identifying a personalized vocabulary based on the gathered plurality of user data. The present invention may include training a voice response system based on the gathered plurality of user data and the identified personalized vocabulary. The present invention may include receiving a verbal request. The present invention may include responding to the received verbal request using the trained voice response system.

17 Claims, 6 Drawing Sheets

(51) Int. Cl.
*G10L 15/06* (2013.01)
*G10L 15/19* (2013.01)
*G06N 3/02* (2006.01)
*G10L 15/16* (2006.01)

(56) References Cited

U.S. PATENT DOCUMENTS

| | | | |
|---|---|---|---|
| 10,594,757 B1* | 3/2020 | Shevchenko et al. | G10L 15/22 |
| 2015/0142828 A1* | 5/2015 | Nguyen | G06F 16/367 707/758 |
| 2019/0228098 A1 | 7/2019 | Daly | |
| 2019/0311301 A1* | 10/2019 | Pyati | G06N 20/00 |
| 2019/0333020 A1* | 10/2019 | Zhao | G06Q 10/107 |

FOREIGN PATENT DOCUMENTS

| | | | | |
|---|---|---|---|---|
| CN | 110869969 A | 3/2020 | | |
| WO | WO 2020120180 A1 * | 6/2020 | | G06N 3/04 |

OTHER PUBLICATIONS

Anonymous, "Interactive Voice Response Market worth 5.54 Billion USD by 2023," Markets and Markets.com, Sep. 1, 2017 [accessed on Apr. 30, 2020], 5 pages, Retrieved from the Internet: <URL: https://www.marketsandmarkets.com/PressReleases/interactive-voice-response.asp>.

IBM, "IBM WebSphere Voice Response for AIX," IBM Knowledge Center, [accessed on Apr. 30, 2020], 3 pages, Retrieved from the Internet: <URL: https://www.ibm.com/support/knowledgecenter/en/SSKNG6/product.html>.

Mell, et al., "The NIST Definition of Cloud Computing", National Institute of Standards and Technology, Special Publication 800-145, Sep. 2011, 7 pages.

Johnson, "Amazon's Alexa now delivers personalized results for up to 10 voices," VentureBeat.com, Oct. 17, 2017 [accessed on Jul. 23, 2020], 9 pages, Retrieved from the Internet: <URL: https://venturebeat.com/2017/10/11/amazons-alexa-now-delivers-personalized-results-for-up-to-10-voices/>.

International Searching Authority, "Notification of Transmittal of the International Search Report and the Written Opinion of the International Searching Authority, or the Declaration," Patent Cooperation Treaty, dated Aug. 30, 2021, 9 pages, International Application No. PCT/CN2021/097735.

Kwatra, et al., "Voice Response Systems Based on Personalized Vocabulary and User Profiling—Personalized Linguistics AI Engines," Application and Drawings, Filed on Jun. 1, 2021, 39 Pages, Related US Patent Application Serial No. PCT/CN2021/097735.

* cited by examiner

VOICE RESPONSE SYSTEMS BASED ON PERSONALIZED VOCABULARY AND USER PROFILING—PERSONALIZED LINGUISTICS AI ENGINES

BACKGROUND

The present invention relates generally to the field of computing, and more particularly to data management and analytics.

Humans may have a unique way of interpreting spoken language, which may be based on an applied emphasis and/or context, given personal experiences and/or events, and/or which may be based on a cultural and/or a demographic influence. Human language may be further based on pragmatics (e.g., a situational context), syntax (e.g., an arrangement of words and phrases in a clause and/or sentence), morphology (e.g., a grammatical and/or lexical word function), semantics (e.g., a word meaning), phonology (e.g., a classification of sounds and/or study), and phonetics (e.g., a study and/or classification of speech sounds), among other things. Artificial intelligence (AI) voice response systems may analyze a user's voice request and may accordingly respond to the user using a preprogrammed response generator.

SUMMARY

Embodiments of the present invention disclose a method, computer system, and a computer program product for personalized voice responses. The present invention may include gathering a plurality of user data from an Internet of Things (IoT) connected sensor. The present invention may include identifying a personalized vocabulary based on the gathered plurality of user data. The present invention may include training a voice response system based on the gathered plurality of user data and the identified personalized vocabulary. The present invention may include receiving a verbal request. The present invention may include responding to the received verbal request using the trained voice response system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
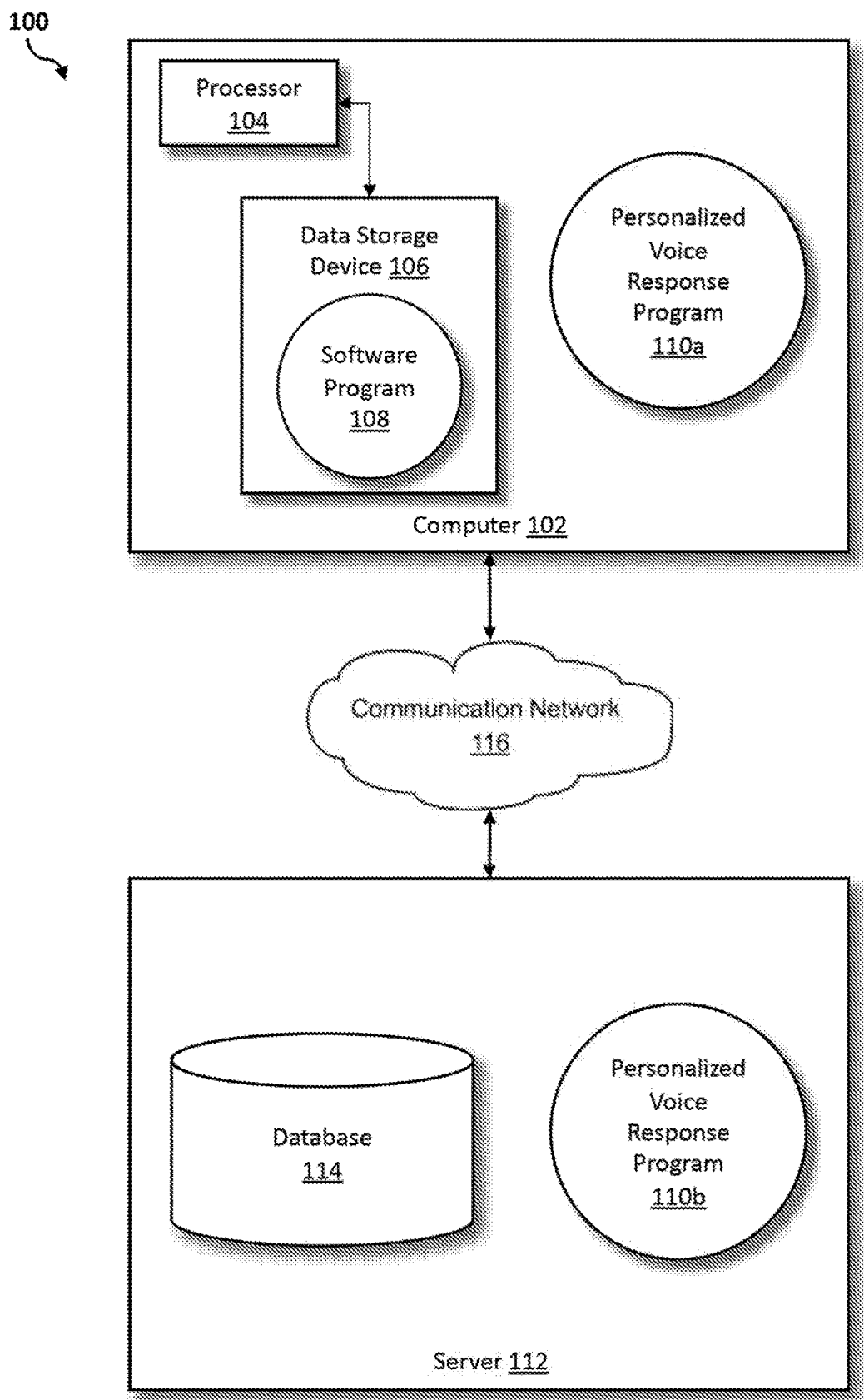
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for personalized voice responses. As such, the present embodiment has the capacity to improve the technical field of data management and analytics by utilizing a personalized vocabulary of a user to formulate a response to a voice request. More specifically, the present invention may include gathering a plurality of user data from an Internet of Things (IoT) connected sensor. The present invention may include identifying a personalized vocabulary based on the gathered plurality of user data. The present invention may include training a voice response system based on the gathered plurality of user data and the identified personalized vocabulary. The present invention may include receiving a verbal request. The present invention may include responding to the received verbal request using the trained voice response system.

As described previously, humans may have a unique way of interpreting spoken language, which may be based on an applied emphasis and/or context, given personal experiences and/or events, and/or which may be based on a cultural and/or a demographic influence. Human language may be further based on pragmatics (e.g., a situational context), syntax (e.g., an arrangement of words and phrases in a clause and/or sentence), morphology (e.g., a grammatical and/or lexical word function), semantics (e.g., a word meaning), phonology (e.g., a classification of sounds and/or study), and phonetics (e.g., a study and/or classification of speech sounds), among other things. Artificial intelligence (AI) voice response systems may analyze a user's voice request and may accordingly respond to the user using a preprogrammed response generator.

In many cases, a user may not understand a keyword and/or a phrase used by the AI voice response system. Similarly, the AI voice response system may not understand a keyword and/or a phrase used by the user. The keyword and/or phrase may be a homophone, a homonym, a name of a location, a smell, a length, a localized verbal corpus, a contextual situation, a trending word and/or phrase, an official and/or a scientific word or phrase, and/or a complex vocabulary word, among other things.

Therefore, it may be advantageous to, among other things, enable an AI voice response system to utilize a personalized vocabulary of the user while responding to a user's voice request.

According to at least one embodiment, the present invention may utilize a personalized vocabulary of a user to generate a response to a received verbal request.

According to at least one embodiment, an artificial intelligence (AI) voice response system may analyze one or more properties of unknown content in a received verbal request and may validate the unknown content against comparatively known content which may be included in a personalized vocabulary of the user.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a personalized voice response program 110a. The networked computer environment 100 may also include a server 112 that is enabled to run a personalized voice response program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the personalized voice response program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the personalized voice response program 110a, 110b (respectively) to utilize a personalized vocabulary of a user to formulate a response to a voice request. The personalized voice response method is explained in more detail below with respect to FIGS. 2 and 3.

Figure 2:
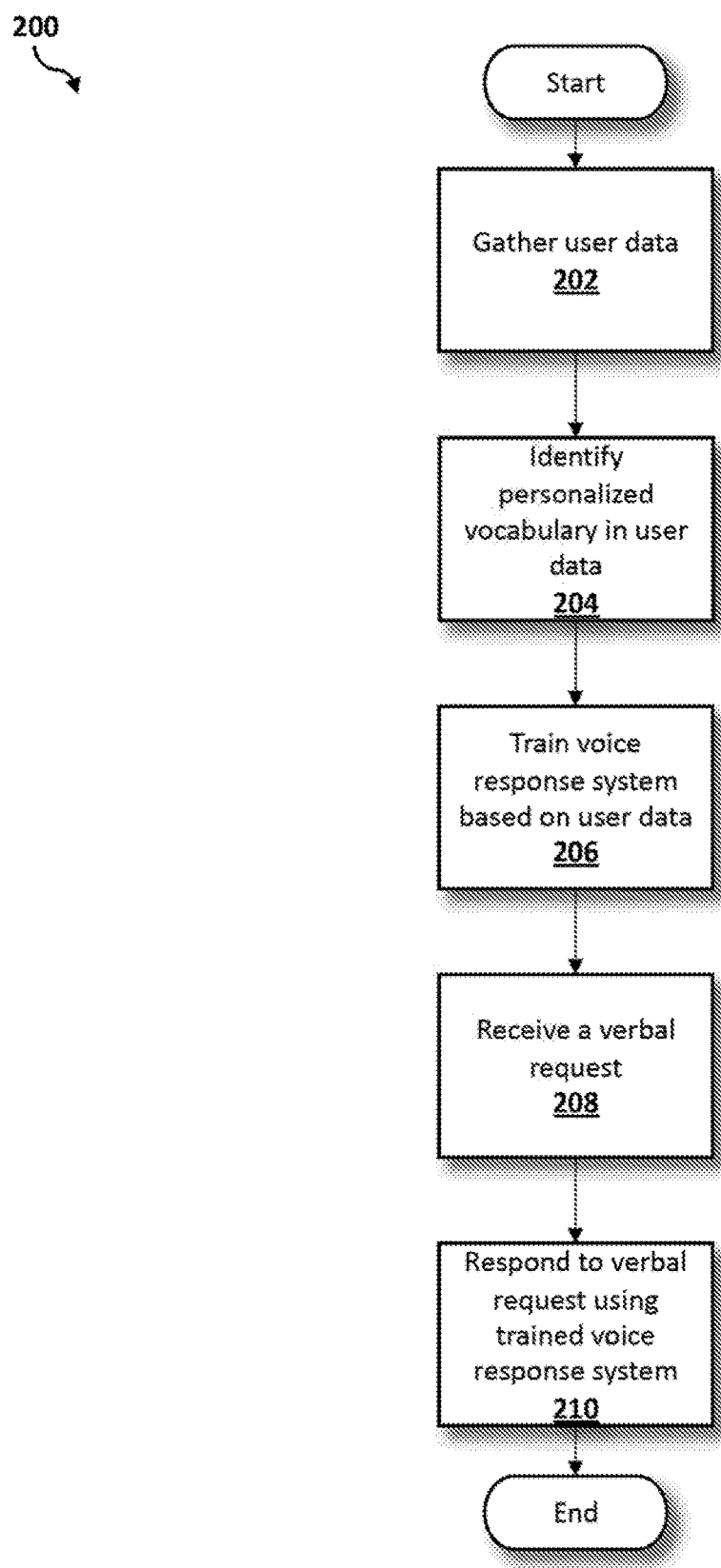
FIG. 2 is an operational flowchart illustrating a process for personalized voice responses according to at least one embodiment.

Referring now to FIG. 2, an operational flowchart illustrating the exemplary personalized voice response process 200 used by the personalized voice response program 110a and 110b according to at least one embodiment is depicted.

At 202, user data is gathered. Internet of Things (IoT) connected sensors (e.g. those embedded in mobile devices, smartphones, smart watches, home appliances, and vehicles, among other things) may be used to gather various information about a user, including but not limited to user mobility patterns, user travel locations, user preferences, user requests (i.e., requests sent by the user), user responses (i.e., responses received from the user), user identification information, and user activities (i.e., activities performed by the user), if any. IoT connected sensors (e.g., temperature sensors, pressure sensors, proximity sensors, optical sensors, and smoke sensors, among other sensors) may identify details about the user, and the device housing the IoT connected sensor may store the identified details in a data store (e.g., a repository for storing and managing collections of data).

Identified details may include, but may not be limited to including, the steps taken by the user to perform an activity such as driving a vehicle and cooking dinner, among other things. For example, IoT connected sensors embedded within the user's vehicle may identify user behavior and habits as the user's behavior and habits relate to the method by which the user drives the vehicle (e.g., turning on a signal one mile before making a turn, and using a horn to beep at a vehicle which enters the roadway 100 feet ahead of the user's vehicle, when the vehicle enters the roadway in a perpendicular direction to the user's vehicle).

At 204, a personalized vocabulary is identified in the gathered user data. The personalized voice response program 110a, 110b (i.e., an artificial intelligence voice response system) may gather user data, as described previously with respect to step 202 above, and may identify activities performed by the user, any requests submitted by the user, and any responses to requests received by the user, among other things.

A user's language patterns, vocabulary, and/or topics may be analyzed by integrating with a variety of external products including, but not limited to, social media tools, IoT devices, reading applications and/or other systems in which the user may speak, read, and/or write content. Analyzing communication that the user creates, engages with, and/or consumes may enable the personalized voice response program 110a, 110b to build the user's personalized vocabulary.

The personalized vocabulary of the user may also be identified through contextual understanding of the user's experience. For example, the personalized vocabulary may be identified based on integration with calendar systems, global positioning systems (GPS), and/or health monitoring systems (e.g., systems capable of making observations relating to health conditions and remotely transmitting health related data), among other things.

IoT connected sensors of the user may gather device content which has been read by the user using data from integrations which may include, but may not be limited to including, a web browser, a web and/or mobile application, and a social media plugin.

Topical information specified by the user may be identified using contextual analysis via latent Dirichlet allocation (LDA), a generative statistical model in natural language processing (NLP) that may enable sets of observations to be mapped to dynamic topics when the language patterns are similar. LDA may be a method which enables the identification of topics within documents and which maps documents to the identified topics. When voice data is mapped to text, as here, by the personalized voice response program 110a, 110b, the mapped text may be classified into dynamic topics.

A user's social network contribution, including text and image information (e.g., shared images, tagged images, among other things), may be analyzed to determine a contextual significance and to further identify a personalized vocabulary of the user. The user's social network profiles, for example, may be accessed via authentication on a connected application programming interface (API) login for the social network account.

A user's context delivered by voice reply (i.e., a voice response) may also be analyzed in identifying a personalized vocabulary, by using a tone analyzer API (e.g., Watson™ Tone Analyzer API). The tone analyzer API may gather patterns of speech and tone. For example, the tone analyzer API, such as Watson™ Tone Analyzer API (Watson and all Watson-based trademarks are trademarks or registered trademarks of International Business Machines Corporation in the United States, and/or other countries), may utilize a database of historical information, including past interactions between the user and the personalized voice response program 110a, 110b, to determine whether the voice reply depicts a tone which is intense, lighthearted, serious, whimsical, or witty, among many other tones of voice.

A personalized vocabulary may be used to predict content which may be known by the user and content which may be unknown, based on a trained module, described with respect to step 206 below.

A personalized vocabulary may be identified for each user of the personalized voice response program 110a, 110b. A user's personalized vocabulary may be stored within a user profile associated with the personalized voice response program 110a, 110b, in a cloud environment, and/or cached on the user's device, among other things, and may be accessed using authenticated credentials (e.g., those set by the user upon initiation with the personalized voice response program 110a, 110b). There may exist a separate knowledge corpus for each user of the personalized voice response program 110a, 110b, with each user being identified by the user's voice profile.

At 206, the personalized voice response program 110a, 110b is trained based on the gathered user data. A bi-directional long short term memory (Bi-LSTM) training module with a text and image information based convolutional neural network (TI-CNN) module may comprise the artificial intelligence voice response system (i.e., the personalized voice response program 110a, 110b) which is trained based on the gathered user data. A Bi-LSTM training module may depict a recurrent neural network (RNN) architecture (e.g., a deep learning module) in which the signal propagates both backwards and forwards (e.g., the data may be read from the beginning to the end and from the end to the beginning), which may enable a faster learning than a one-directional approach. The Bi-LSTM training module may continuously gather user data and may contextually identify, classify, and learn using pattern analysis along with the text and image information based convolutional neural network (TI-CNN) module.

A LSTM training module may be useful in text and/or speech analysis because the LSTM training module may consider the context of other words in the text and/or speech. A forward LSTM training module may predict the next parts of speech during a voice response conversation to enable the forward LSTM training module to better anticipate a user's needs. A backward LSTM training module may predict the previous parts of speech during a voice response conversation, which may enable the backward LSTM training module to have more context surrounding a user's current ask. A Bi-LSTM may do both (e.g., anticipating a user's needs and considering past parts of the user's conversation), thereby better enabling both a user's future intention and a context of the user's conversation.

At 208, a verbal request is received. The personalized voice response program 110a, 110b may deconstruct the received verbal request (e.g., by parsing through the received verbal request to determine a semantic structure, among other things) as well as content delivered by previous voice reply (i.e., a previous voice response), as described previously with respect to step 204 above, in order to formulate a voice response to the received verbal request. The personalized voice response program 110a, 110b may analyze unknown contents of a to-be-delivered voice response (e.g., portions of the verbal request which require a personalized response by the user) and may identify similar content in the user's personalized vocabulary which may be used to respond to the received verbal request. Here, the personalized voice response program 110a, 110b may be formulating a response to the verbal request based on one or more identified patterns in the user's personalized vocabulary.

The personalized voice response program 110a, 110b may use K-means clustering to perform a similarity analysis using the user's personalized vocabulary. K-means clustering may be an unsupervised machine learning algorithm which may cluster data together based on determined similarities. For example, the received user request may relate to the current weather, and the personalized voice response program 110a, 110b may determine how to communicate "the weather will be cold in the morning" (e.g., using the word 'cold' as opposed to 'chilly' and 'morning' as opposed to 'AM') based on the user's personalized vocabulary.

If similar and/or comparative content is not available in the personalized vocabulary of the user, then the personalized voice response program 110a, 110b may employ an external assistance function and/or may search the personalized vocabulary of other users (e.g., similar users, and/or closely located users based on determined GPS location, etc.), found using local stores and/or databases, and/or by leveraging a regional linguistic corpus of consolidated vocabularies, phrases, and/or vocal personalization that may apply to the specific user and/or a cultural or regional subset of the local population.

A semantic similarity may be estimated by defining a topological similarity, by using ontologies to define a distance between terms and/or concepts. Ontologies may be used to formalize groups of definitions, categories, properties, and entities, among other things, to better group both data in and data out. For example, a naïve metric for the comparison of concepts ordered in a partially ordered set and represented as nodes of a directed acyclic graph (e.g., a taxonomy), may be the shortest path linking the two concept nodes.

IBM's Watson™ Ground Truth Editor (Watson and all Watson-based trademarks are trademarks or registered trademarks of International Business Machines Corporation in the United States, and/or other countries) for document stemming may also be used to establish ontologies which may be understandable to the user. This may enhance the utilization of synonyms and the understanding of user content for an improved correlation of a user's knowledge space with unknown content.

Document annotation and classification of the target domain done through IBM's Watson™ Ground Truth Editor may include manually classifying and/or annotating some of the training and/or served data in the personalized voice response program 110a, 110b. Watson™ Ground Truth Editor may obtain ground truth, or the collection of vetted data that may be used to adapt Watson™ to a particular domain. Human users may assist in the classification of ground truth.

If similar and/or comparative content is not available in the personalized vocabulary of the user, nor in the personalized vocabularies of other (e.g., similar) users, then the personalized voice response program 110a, 110b may refer back to an individual from which the verbal request was made (e.g., by verbal request for information from the original requestor), to explain the verbal request in further detail.

For example, the personalized voice response program 110a, 110b may verbally inquire from an original requestor whether the type of "wrapping" to which the user refers is in relation to paper (e.g., wrapping paper) or a music genre (e.g., rap music).

At 210, the voice response system responds to the received verbal request. The personalized voice response program 110a, 110b may construct a response to the received verbal request by using information gathered from the personalized vocabulary and/or the personalized vocabularies of similar users, and may verbally deliver same to the user.

In responding to the received verbal request, the personalized voice response program 110a, 110b may analyze historical information about the user (e.g., travel locations, activities performed, content read, known words, etc.) to identify the knowledge possessed by the user. In doing so, the personalized voice response program 110a, 110b may utilize the identified personalized vocabulary of the user to generate a verbal response to the received verbal request which may be comprehendible by the user.

Figure 3:
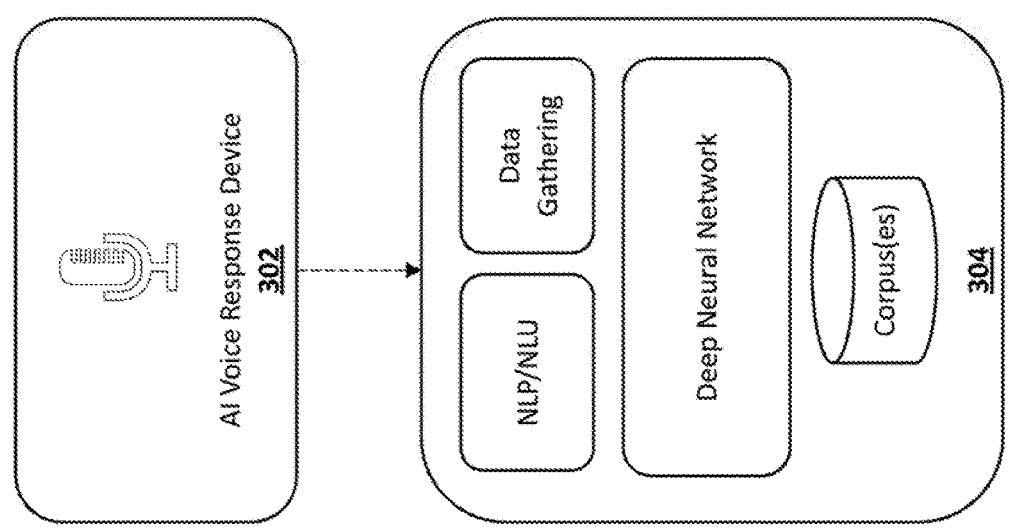
FIG. 3 is a block diagram of the personalized voice response program according to at least one embodiment.

Referring now to FIG. 3, a block diagram 300 of the personalized voice response program 110a and 110b according to at least one embodiment is depicted. A user speaks a voice request to an artificial intelligence voice response device 302 equipped with an embedded microphone. The voice request received by the artificial intelligence voice response device 302 may be connected to the personalized voice response program 110a, 110b, as depicted by 304, which may process the received voice request. The personalized voice response program 110a, 110b, depicted by 304, may be capable of performing natural language processing (NLP) and natural language understanding (NLU) techniques, and same may be used to analyze gathered data (e.g., the spoken voice request). Other data gathered by the artificial intelligence voice response device 302 and/or other connected Internet of Things (IoT) devices may be stored in the data gathering module of the personalized voice response program 110a, 110b, depicted by 304.

The embedded deep neural network, also depicted by 304, within the personalized voice response program 110a, 110b, may utilize training modules to analyze previous voice responses of the user, and optionally, those of similar users, to generate a personalized response to a user request. The corpus of data contained by the personalized voice response program 110a, 110b, as depicted by 304, may be a personalized linguistics corpus (i.e., a personalized vocabulary) of a user, which may include pragmatics, syntax, morphology, semantics, phonology, and/or phonetics specific to the given user.

Optionally, a bi-directional feed may be utilized by the personalized voice response program 110a, 110b, depicted by 304, to access a regional and/or cultural linguistics corpus which may include language data that does not appear in the user's personalized corpus, but which may be useful in responding to a received voice request.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

According to at least one alternate embodiment, an iterative feedback learning module may be included in the personalized voice response program, which may enable the monitoring of a user's reactions, to a response provided by the personalized voice response program, via proximity cameras and/or IoT sensors which may assist in determining the level of a user's satisfaction. For example, the iterative feedback learning module may employ facial scanning technology and/or tone analyzers to look for indicators of user satisfaction which may range from confusion and/or frustration to happiness, among other things. Depending on the content and satisfaction level, the iterative feedback learning module may refine and/or modify the corpus of user data in order to improve the accuracy of the user's personalized vocabulary, to improve the accuracy of responses to received verbal requests, and to optimize a user's satisfaction with the personalized voice response program.

Figure 4:
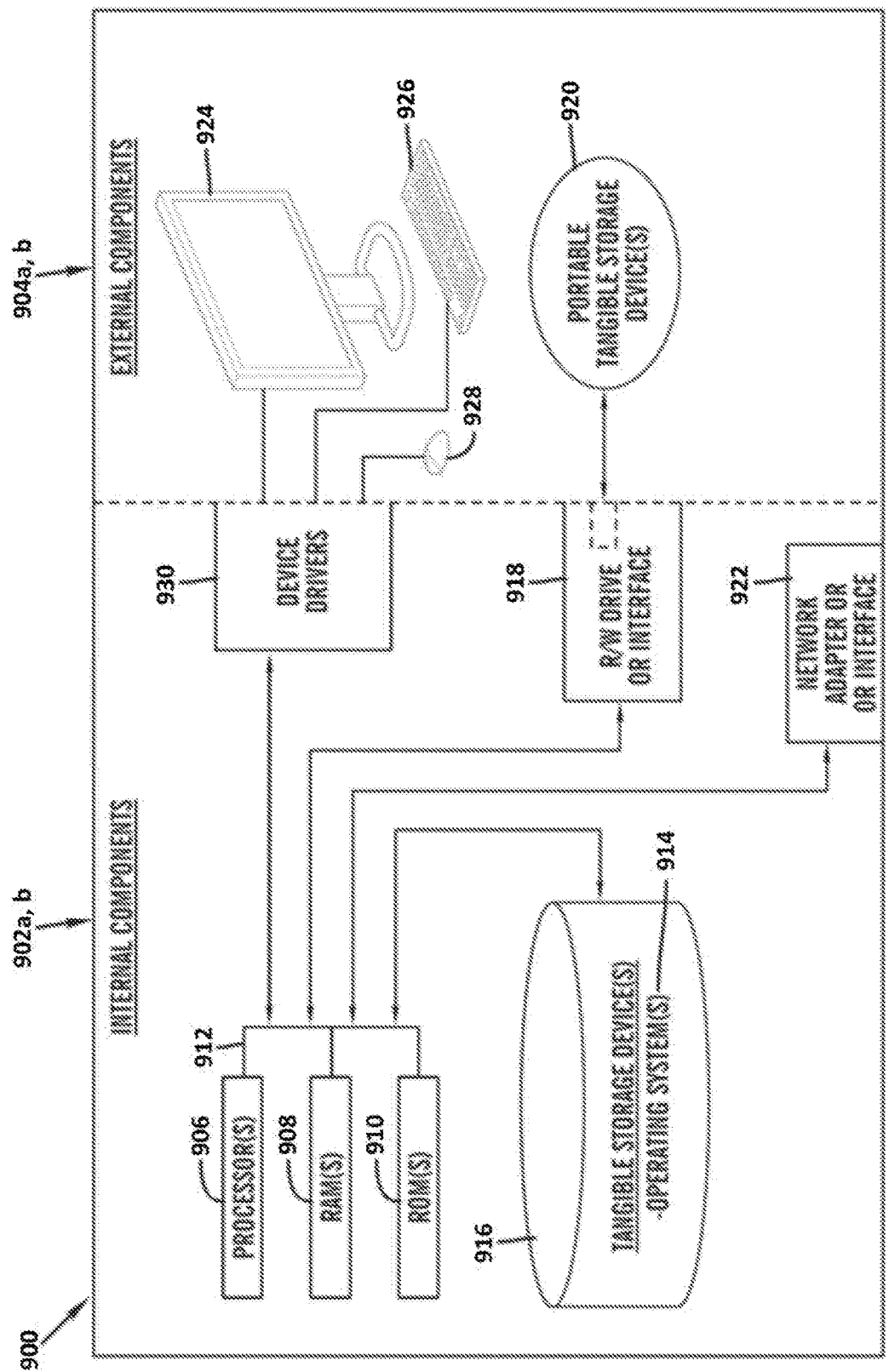
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the personalized voice response program 110a in client computer 102, and the personalized voice response program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the personalized voice response program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the personalized voice response program 110a in client computer 102 and the personalized voice response program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the personalized voice response program 110a in client computer 102 and the personalized voice response program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
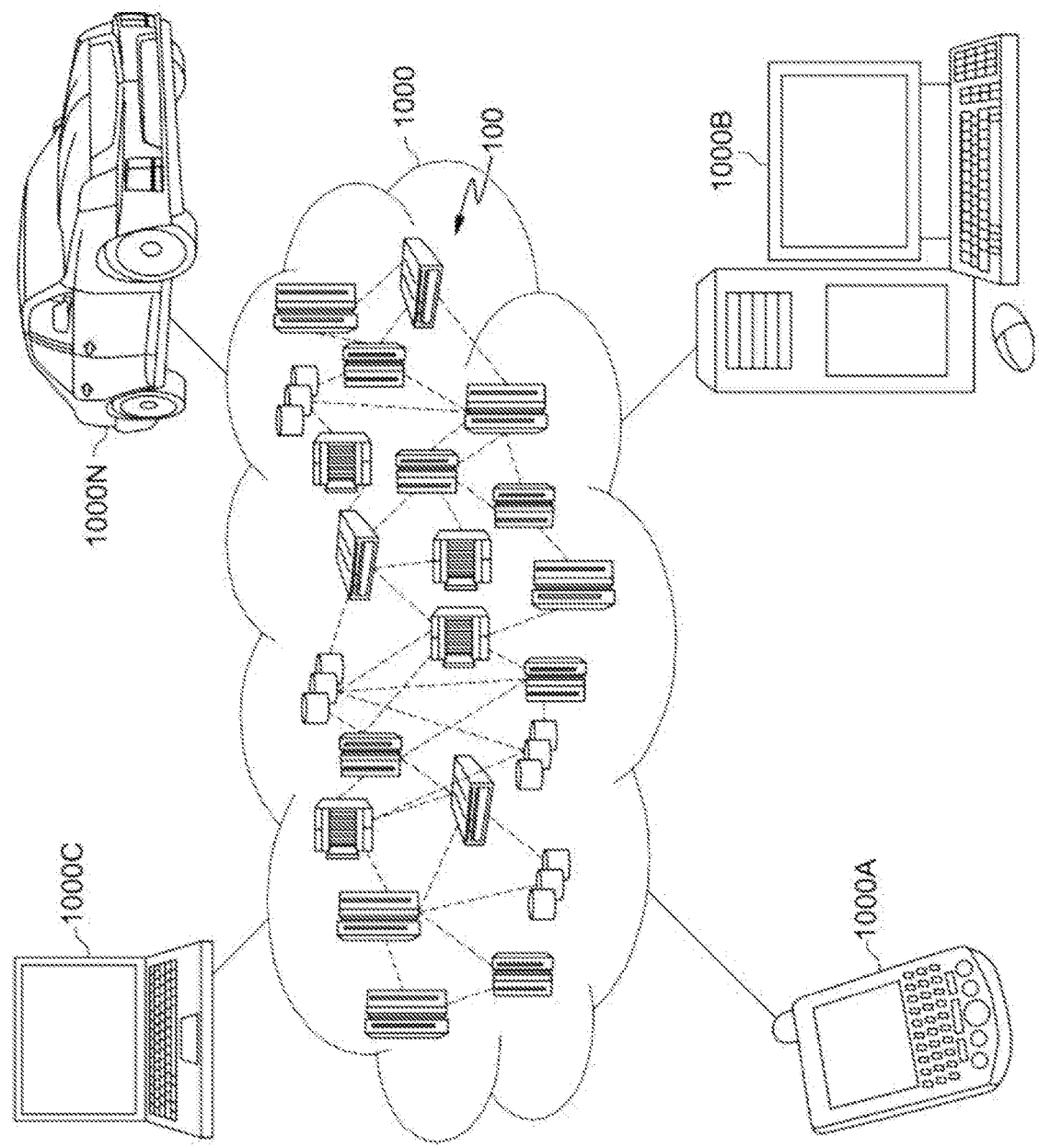
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
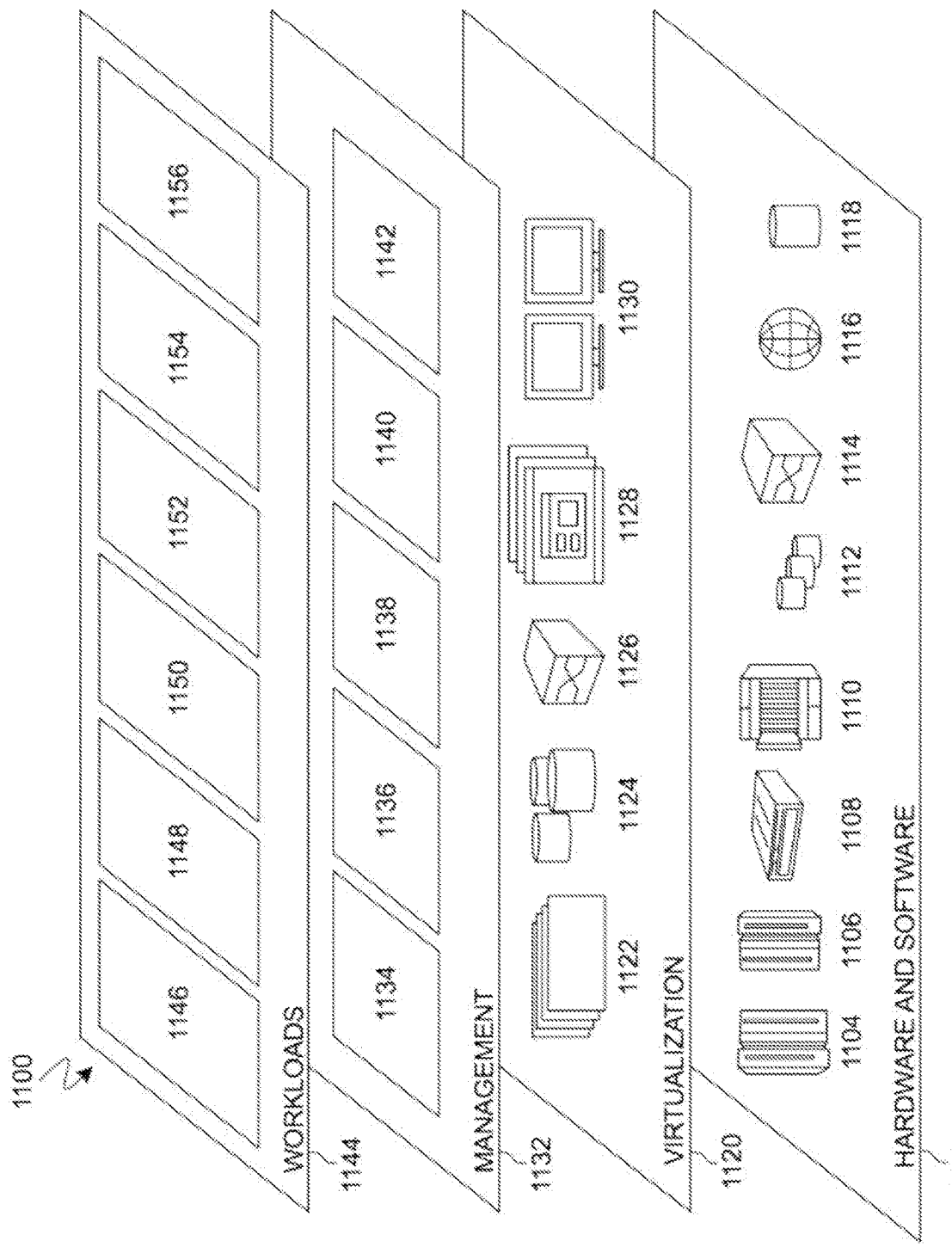
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and personalized voice response 1156. A personalized voice response program 110a, 110b provides a way to utilize a personalized vocabulary of a user to formulate a response to a voice request.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for personalized voice responses, the method comprising:
    gathering a plurality of user data from an Internet of Things (IoT) connected sensor;
    identifying a personalized vocabulary based on the gathered plurality of user data;
    training a voice response system based on the gathered plurality of user data and the identified personalized vocabulary, using a bi-directional long short term memory (Bi-LSTM) training module which contextually identifies, classifies, and learns using pattern analysis, and a text and image information based convolutional neural network (TI-CNN) module;
    receiving a verbal request; and
    responding to the received verbal request using the trained voice response system and a similar and closely located user's personalized vocabulary, as necessary, wherein the similar and closely located user is identified using a regional linguistic corpus which employs an ontology for similarity of vocabulary.

2. The method of claim 1, wherein the gathered plurality of user data is selected from the group consisting of user mobility patterns, user travel locations, user preferences, user requests, user responses, user identification information, and user activities.

3. The method of claim 1, wherein identifying the personalized vocabulary based on the gathered plurality of user data further comprises:
    identifying topical information of the gathered plurality of user data using contextual analysis via latent Dirichlet allocation (LDA); and
    determining a contextual significance of the gathered plurality of user data based on a social network contribution.

4. The method of claim 1, wherein receiving the verbal request further comprises:
    deconstructing the received verbal request;
    using K-means clustering to identify content in the personalized vocabulary which is similar to the received verbal request; and
    if no content is identified which is similar to the received verbal request, searching the similar and closely located user's personalized vocabulary, based on a global positioning system (GPS) location.

5. The method of claim 4, further comprising:
leveraging a regional linguistic corpus of consolidated vocabularies, phrases, and vocal personalization to find content similar to the received verbal request.

6. The method of claim 4, wherein responding to the received verbal request using the trained voice response system further comprises:
utilizing the identified content to construct a response to the received verbal request.

7. A computer system for personalized voice responses, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
gathering a plurality of user data from an Internet of Things (IoT) connected sensor;
identifying a personalized vocabulary based on the gathered plurality of user data;
training a voice response system based on the gathered plurality of user data and the identified personalized vocabulary, using a bi-directional long short term memory (Bi-LSTM) training module which contextually identifies, classifies, and learns using pattern analysis, and a text and image information based convolutional neural network (TI-CNN) module;
receiving a verbal request; and
responding to the received verbal request using the trained voice response system and a similar and closely located user's personalized vocabulary, as necessary, wherein the similar and closely located user is identified using a regional linguistic corpus which employs an ontology for similarity of vocabulary.

8. The computer system of claim 7, wherein the gathered plurality of user data is selected from the group consisting of user mobility patterns, user travel locations, user preferences, user requests, user responses, user identification information, and user activities.

9. The computer system of claim 7, wherein identifying the personalized vocabulary based on the gathered plurality of user data further comprises:
identifying topical information of the gathered plurality of user data using contextual analysis via latent Dirichlet allocation (LDA); and
determining a contextual significance of the gathered plurality of user data based on a social network contribution.

10. The computer system of claim 7, wherein receiving the verbal request further comprises:
deconstructing the received verbal request;
using K-means clustering to identify content in the personalized vocabulary which is similar to the received verbal request; and
if no content is identified which is similar to the received verbal request, searching the personalized vocabulary of a similar and closely located user, based on a global positioning system (GPS) location.

11. The computer system of claim 10, further comprising:
leveraging a regional linguistic corpus of consolidated vocabularies, phrases, and vocal personalization to find content similar to the received verbal request.

12. The computer system of claim 10, wherein responding to the received verbal request using the trained voice response system further comprises:
utilizing the identified content to construct a response to the received verbal request.

13. A computer program product for personalized voice responses, comprising:
one or more non-transitory computer-readable storage media and program instructions stored on at least one of the one or more tangible storage media, the program instructions executable by a processor to cause the processor to perform a method comprising:
gathering a plurality of user data from an Internet of Things (IoT) connected sensor;
identifying a personalized vocabulary based on the gathered plurality of user data;
training a voice response system based on the gathered plurality of user data and the identified personalized vocabulary, using a bi-directional long short term memory (Bi-LSTM) training module which contextually identifies, classifies, and learns using pattern analysis, and a text and image information based convolutional neural network (TI-CNN) module;
receiving a verbal request; and
responding to the received verbal request using the trained voice response system and a similar and closely located user's personalized vocabulary, as necessary, wherein the similar and closely located user is identified using a regional linguistic corpus which employs an ontology for similarity of vocabulary.

14. The computer program product of claim 13, wherein the gathered plurality of user data is selected from the group consisting of user mobility patterns, user travel locations, user preferences, user requests, user responses, user identification information, and user activities.

15. The computer program product of claim 13, wherein identifying the personalized vocabulary based on the gathered plurality of user data further comprises:
identifying topical information of the gathered plurality of user data using contextual analysis via latent Dirichlet allocation (LDA); and
determining a contextual significance of the gathered plurality of user data based on a social network contribution.

16. The computer program product of claim 13, wherein receiving the verbal request further comprises:
deconstructing the received verbal request;
using K-means clustering to identify content in the personalized vocabulary which is similar to the received verbal request; and
if no content is identified which is similar to the received verbal request, searching the personalized vocabulary of a similar and closely located user, based on a global positioning system (GPS) location.

17. The computer program product of claim 16, further comprising:
leveraging a regional linguistic corpus of consolidated vocabularies, phrases, and vocal personalization to find content similar to the received verbal request.

* * * * *